March 5, 1957  SHELDON S. L. CHANG  2,784,362
ELECTRIC MOTOR CIRCUITS

Filed Nov. 17, 1955  2 Sheets-Sheet 1

INVENTOR.
SHELDON S. L. CHANG,
BY
ATTORNEYS.

March 5, 1957  SHELDON S. L. CHANG  2,784,362
ELECTRIC MOTOR CIRCUITS
Filed Nov. 17, 1955  2 Sheets-Sheet 2

INVENTOR.
SHELDON S. L. CHANG,
BY
ATTORNEYS.

United States Patent Office 2,784,362
Patented Mar. 5, 1957

2,784,362

ELECTRIC MOTOR CIRCUITS

Sheldon S. L. Chang, New York, N. Y., assignor to Robbins & Myers, Inc., Springfield, Ohio, a corporation of Ohio Application November 17, 1955, Serial No. 547,360

13 Claims. (Cl. 318—103)

This invention relates to electric motor circuits and more particularly to circuits useful in the operation of two electric motors under conditions where it is desired under some circumstances to operate one motor only and under other circumstances to operate both motors, and further where one of the motors may be a two-speed motor.

While the invention will have various applications, it is particularly useful in connection with the operation of motors in air conditioning units, wherein there is provided a motor driven compressor and a motor driven fan to circulate outdoor air through the condenser and indoor air through the evaporator. Under some conditions it is desirable to operate the fan motor only for air circulation and this may be at high or low speeds. Under other conditions, it may be desirable to operate both motors concurrently with the fan motor operating at either high or low speeds.

Generally speaking, according to the prior art the fan motor has been either of the shaded pole type or of the permanent split capacitor type. The shaded pole type is objectionable because of its low power factor, while the permanent split capacitor type generally has an oil filled capacitor attached to it to improve the power factor and thereby enhance the performance but at considerable additional expense. Furthermore, the operation of one motor alone or both motors together and with one of the motors at different speeds has necessitated complicated switching arrangements, all of which has added to the cost of the units.

With the foregoing considerations in mind, it is an object of the present invention to provide as a fan motor a motor which is as inexpensive in manufacturing cost as a shaded pole motor but which has a performance comparable to a permanent split capacitor motor.

It is another object of the invention to eliminate the capacitor which is ordinarily provided when the fan motor is of the permanent split capacitor type.

Another object involves the use of the standard compressor motor in the organization without detracting from the compressor motor performance. A still further object is to maintain a good power factor for the unit as a whole and specifically to maintain a power factor as good or better as that of the compressor motor alone. A still further object of the invention involves the provision of an arrangement whereby the fan motor can be operated alone at one or more speeds or together with the compressor motor with the fan motor operating at one or more different speeds without the necessity of providing a complicated switching arrangement.

These and other objects of the invention which will be pointed out in more detail hereinafter or which will be apparent to one skilled in the art upon reading these specifications, I accomplish by that construction and arrangement of parts of which I shall now disclose certain embodiments.

Reference is made to the drawings forming a part hereof and in which.

Briefly, in the practice of my invention I provide two electric motors each having a main winding and a starting winding. The two main windings are connected in parallel and the two starting windings are connected in series. One of the motors (the compressor motor, if the arrangement is used in an air conditioning unit) has a pair of capacitors in parallel and both in series with the starting winding, one of the capacitors being a starting capacitor and the other a running capacitor. The running capacitor is placed in series with the starting winding of the other of the two motors (the fan motor, if this be an air conditioning unit), and serves as a starting capacitor for the latter. Preferably also the fan motor will be a non-quadrature motor with the starting winding displaced 120° with respect to its main winding. Furthermore, while generally speaking a starting winding has more turns than a main winding in a conventional electric motor, I prefer that the starting winding consist of less turns than the main winding.

Figure 1:
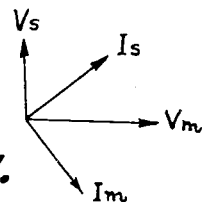
Figures 1 and 2 are diagrams helpful in the understanding of the invention.
Figure 2:
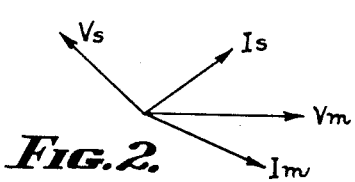

In Figures 1 and 2, I have illustrated the difference between a quadrature motor and a non-quadrature motor. In Figure 1 the vectors $V_s$ and $I_s$ are the voltage and current vectors for the starting winding, and the vectors $V_m$ and $I_m$ are the vectors for the voltage and current of the main winding. It will be observed that $V_s$ and $V_m$ are at 90° to each other, which is the normal situation in a quadrature motor. In Figure 2 I have illustrated the situation in a non-quadrature motor wherein the starting windings are displaced 120° from the main windings. By shifting the starting winding to the 120° position, $V_s$ is shifted also to the 120° position approximately. Since $I_s$ is determined primarily by the more powerful compressor motor starting winding requirements, it remains at its slightly leading position as shown in Figure 2. By the above means I have made $I_s$ and $V_s$ approximately 90° out of phase and consequently the starting winding of the fan motor behaves exactly the same as a pure reactance. As is well known in the art, a pure reactance in series with a capacitance is totally equivalent to a larger capacitance in its function in A. C. circuits. I can preserve the performance of the compressor motor by using a smaller capacitor. For instance, in a 115 volt 60 cycle ¾ H. P. unit, the running capacitor is usually 15 microfarad. With the arrangement of Figure 2, a 12 microfard running capacitor is used and the compressor motor operates the same as if it were operating without the fan motor but with a 15 microfarad running capacitor. Of course I may also use the arrangement of Figure 2, and keep the capacitor value at 15 microfarad, then the power factor will be further improved. In contrast to this, with quadrature windings as shown in Figure 1, $V_s$ and $I_s$ are at a sharp angle from each other and the fan motor will impede the power flow to the starting winding of the compressor motor and weaken the compressor motor somewhat. It should be understood that it is not necessary to the successful operation of the present invention that the fan motor be a non-quadrature motor but the operation of the unit is greatly improved if the fan motor is as described above in Figure 2.

Figure 3:
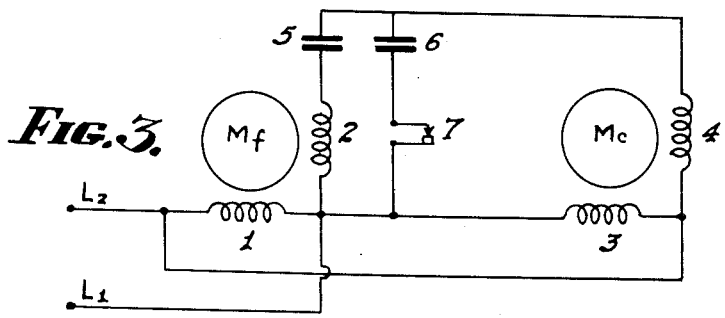
Figure 3 is a basic wiring diagram according to the invention.

Turning now to Figure 3, the fan motor is indicated at $M_f$ and the compressor motor at $M_c$. The main winding of the fan motor is indicated at 1 and the starting winding of the fan motor is indicated at 2. The main winding of the compressor motor is indicated at 3 and the starting winding of the compressor motor at 4. 5 is a running capacitor and 6 a starting capacitor for the compressor motor and 7 is a normally closed contact of the starting relay. The starting relay simply opens to cut out the starting capacitor when the compressor motor comes up to about 2/3 of its running speed. The line terminals are indicated at $L_1$ and $L_2$. It is believed that the basic circuitry will be understood from a study of Figure 3. It will be observed that the main windings of the two motors at 1 and 3 are in parallel and that the starting windings of the two motors at 2 and 4 are in series. It will be observed further that the running and starting capacitors 5 and 6 are in parallel with each other and together are in series with the starting winding 4 of the compressor motor. It should also be observed that the running capacitor 5 is in series with the starting winding 2 of the fan motor.

As discussed above, the fan motor starting winding 2 has relatively fewer turns than the main winding 1. The starting winding power of the fan motor is derived from the starting phase of the compressor motor. It should be noted that the starting condenser current of the compressor motor, which is momentarily large, never passes through the fan motor starting winding and that only the relatively small running capacitor current passes through the fan motor starting winding. Since the running condenser current is relatively constant (being from about 1½ to about twice the locked current when the compressor motor is running) the series connection of the starting winding of the fan motor to the running condenser is advantageous. It should also be noticed that the fan motor, as an unbalanced two-phase motor, can tolerate current imbalance much better than voltage imbalance.

With this circuit, the fan motor may run when the compressor motor is not in operation. While it is true that the starting winding current of the fan motor will go through the compressor motor, no damage can result because watt loss in the compressor motor due to this current is only three or four watts.

It should be noted that I have not shown the connections for the relay 7. This is well known in the art and it is connected so that the contactor 7 will open when the compressor motor is running at approximately two-thirds of its running speed and above. It will be understood that the contactor could also be normally open. It would then be closed when the compressor motor is energized and would open again when the compressor motor comes to speed.

Figure 4:
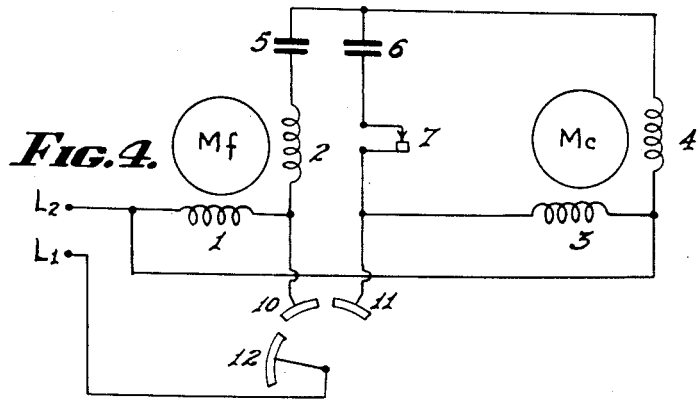
Figure 4 is a wiring diagram wherein the fan motor is a single speed motor and wherein the fan motor may be caused to operate alone or together with the compressor motor.
Figure 5:
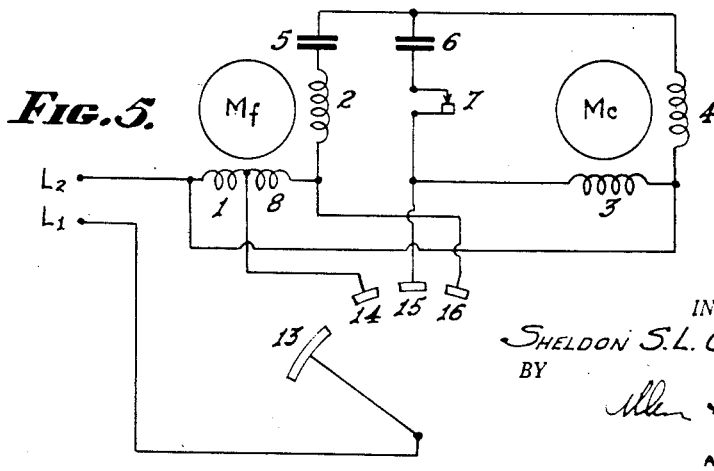
Figure 5 is a diagram of an arrangement wherein the fan motor is a two-speed motor.

In Figures 4 and 5, I have shown two applications of the basic circuit. In Figure 4, the arrangement is applied to a situation involving a single speed fan motor and a compressor motor. It will be observed that I provide contacts 10 and 11 and a movable contact 12 which may be placed in connection with the contact 10 or with both contacts 10 and 11. In the position shown in Figure 4 there is an open circuit or off position.

When the contact 12 is moved into connection with the contact 10, two current paths are provided—(1) from $L_1$—12—10—1—$L_2$, and (2) $L_1$—12—10—2—5—4—$L_2$. In the latter current path, there is also the branch —6—7—3— instead of 4. Because of the high impedance of the capacitor 5, the voltage drops in the windings 3 and 4 are negligible. Thus, with the contact 12 in engagement with the contact 10, the fan, only, operates.

If now the contact 12 is moved to connect with both contacts 10 and 11, three current paths are initially set up as follows: (1) $L_1$—12—10—1—$L_2$; (2) $L_1$—12—10—2—5—4—$L_2$ with the branch —12—11—7—6—4; and (3) $L_1$—12—11—3—$L_2$.

As soon as the motor $M_c$ comes up to approximately two-thirds of its running speed the contactor 7 opens, as is well known, and path (2) above becomes $L_1$—12—10—2—5—4—$L_2$ only. It will be clear from the above that paths (1) and (2) energize the fan motor and paths (2) and (3) energize the compressor motor. Path (2) is common to both switch positions.

In Figure 5, I have shown a similar circuit wherein the fan motor $M_f$ is a two-speed motor. In this arrangement it will be noted that the motor $M_f$ is provided with a divided running winding wherein both windings 1 and 8 are energized as the main winding for the slow speed of the fan motor and only coil 1 is energized as the main winding for the high speed of the motor. Again I provide the movable contact 13 corresponding to the contact 12, but this time there are three contacts with which the contact 13 can engage. In the illustrated position, i. e. the off position, there is an open circuit. When the contact 13 engages the contact 14, the fan motor only will be energized and at high speed since only the coil 1 and not the coil 8 is energized as the main winding. When the contact 13 engages the contacts 14 and 15 together, both motors $M_f$ and $M_c$ will operate with $M_f$ operating at high speed as before. If the contact 13 is moved to engage contacts 15 and 16, it will be observed that coil 8 is brought into the main circuit and therefore the fan motor will operate at low speed and the compressor motor will also run.

If then the contact 13 is engaged only with the contact 16, the compressor motor will not run and the fan motor will run alone and at low speed since both coils 1 and 8 will be in the main circuit. Considering then the five possible positions of the contact 13, we may tabulate the results as follows: Position 1 (illustrated) off; position 2, 13 engages 14, fan motor only high speed; position 3, 13 engages 14 and 15, both motors on, fan motor high speed; position 4, 13 engages 15 and 16, both motors on, fan motor low speed; position 5, 13 engages 16, fan motor only low speed.

It will be clear that in positions 2 and 3 only coil 1 is in the main winding while in positions 4 and 5 coils 1 and 8 together are in the main winding. As is well known, with fewer turns in the main winding the motor will run at full speed, whereas when more turns are introduced the motor will run at reduced speed.

Figure 6:
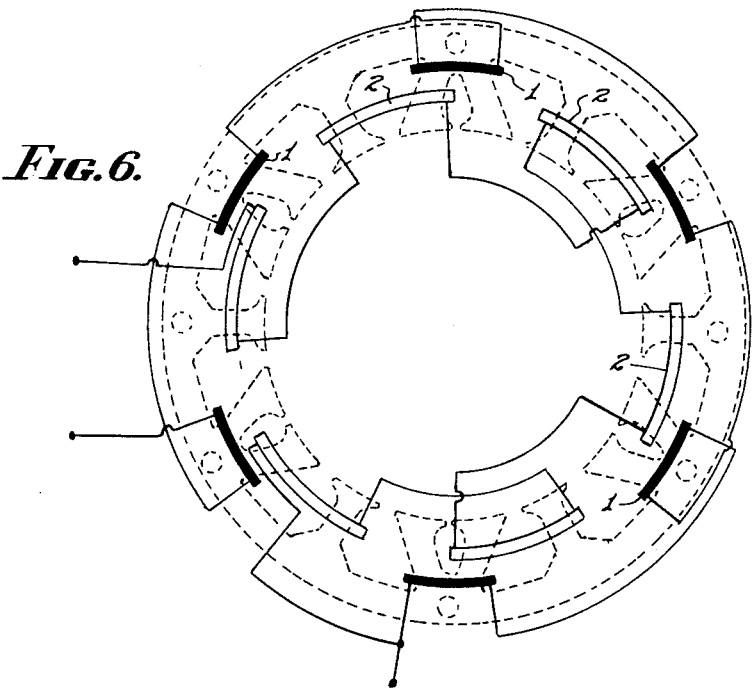
Figure 6 is an elevational view of the stator of a preferred fan motor, showing diagrammatically the windings for a single speed motor.
Figure 7:
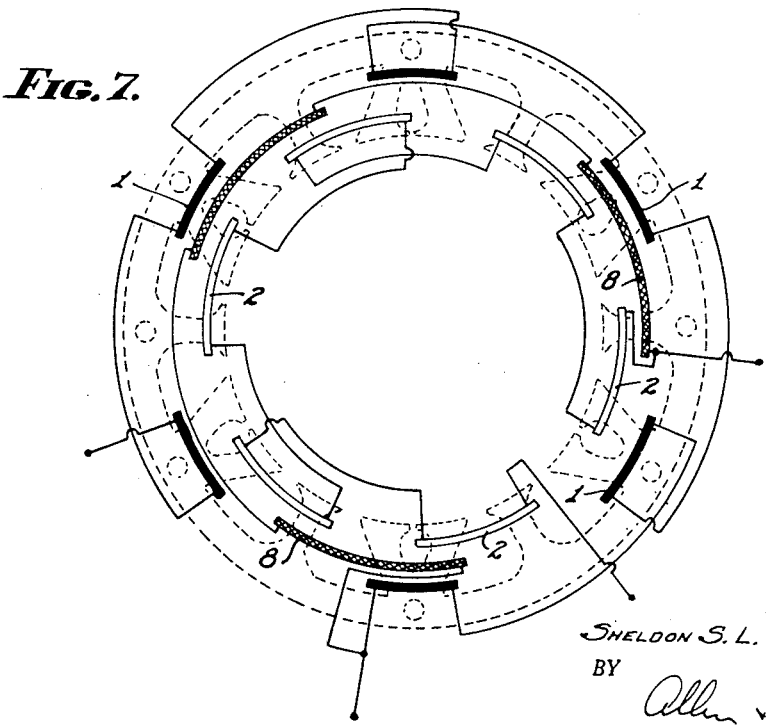
Figure 7 is a view similar to Figure 6 showing the windings for a two speed motor.

Preferably the fan motor is of the split pole type disclosed in my copending application, Serial No. 319,935, filed November 12, 1952. Figure 6 shows the single speed winding arrangement together with the lamination. Its only difference from an ordinary split pole motor is that it has fewer turns of starting winding. Figure 7 shows the two speed winding arrangement with the locations of the three sets of windings. For low speed operation, the coil 8 is in series with coil 1, giving more turns of main winding and less turns of starting winding. Since the main winding is connected across a constant voltage source and the starting winding is connected in series with an essentially constant current source, both the volts per turn of the main winding and total ampere turns of the starting winding are simultaneously reduced. Therefore, the motor is weaker and runs at a lower speed. For high speed operation, coil 8 is in series with coil 2, giving less turns of main winding and more turns of starting winding. The effect is opposite to that mentioned above.

Due to the fact that it does not have any shading coil loss, the motor is much more efficient than a shaded pole motor. With a lamination of 4.6" outside diameter, only 1" of stack length is required to produce 1/12 H. P. at 1050 R. P. M., while for the same application and with the same outside diameter, 2" of stack is necessary for the shaded pole motor. The reduction in cost due to shorter stack length balances the increase in cost for inserting a more complicated winding. The motor presumably can be manufactured at about the same cost as a shaded pole motor of same rating. However, it runs cool and is therefore more durable than the shaded pole motor and its power factor is much higher.

It will be understood that Figures 4 and 5 are simply two applications of the basic principle of Figure 3 and that these applications are particularly useful in connection with air conditioning units having a fan motor and a compressor motor where it is sometimes desired to run the fan motor only and at other times it is desired to run both motors together, with additional ramification that the fan motor may be a two-speed motor. Further ramifications within the scope of the general invention of Figure 3 and other applications of the invention will suggest themselves readily to those skilled in the art.

It will therefore be understood that the disclosure herein is exemplary only and that I do not intend to limit myself otherwise than as set forth in the claims to follow.

Having now fully described my invention, what I claim as new and desire to secure by Letters Patent is:

1. An electric circuit for operating two electric motors each having a main winding and a starting winding, said circuit including a parallel connection of said two main windings, a series connection of said two starting windings, one of said motors having a starting capacitor and a running capacitor in parallel and both in series with its starting winding, and the said running capacitor being in series with the starting winding of the other of said motors to serve as a starting and running capacitor for the latter.

2. An electric circuit according to claim 1, wherein the starting winding of said other motor is out of quadrature with the main winding thereof.

3. An electric circuit according to claim 1, wherein the starting winding of said other motor is at an angle of 120° with respect to the main winding thereof.

4. An electric circuit according to claim 1, wherein the starting winding of said other motor consists of less turns than the main winding thereof.

5. An electric circuit according to claim 1, wherein said one motor is a compressor motor and said other motor is a fan motor in an air conditioning unit.

6. In an air conditioning unit comprising a fan motor and a compressor motor, parallel connected starting and running capacitors for said compressor motor in series with the starting winding thereof, said running capacitor being also in series with the starting winding of said fan motor, and said running capacitor being of high impedance, and switching means for said motors, said switching means having an off position wherein an open circuit is provided; a second position establishing two parallel circuits (1) through the fan motor main winding and (2) the fan motor starting winding, the latter parallel circuit also including in series the compressor motor and its running capacitor; and a third position establishing three parallel circuits (1) through the fan motor main winding, (2) the fan motor starting winding, compressor motor running capacitor, and compressor motor starting winding, and, (3) the compressor motor starting capacitor and starting winding in parallel with the compressor motor main winding; whereby in the second position said fan motor, only, operates and in the third position both motors operate.

7. An electric circuit according to claim 6, wherein the starting winding of said fan motor is out of quadrature with the main winding thereof.

8. An electric circuit according to claim 6, wherein the starting winding of said fan motor is at an angle of 120° with respect to the main winding thereof.

9. An electric circuit according to claim 6, wherein the starting winding of said fan motor consists of less turns than the main winding thereof.

10. In an air conditioning unit comprising a two-speed fan motor and a compressor motor, parallel connected starting and running capacitors for said compressor motor in series with the starting winding thereof, said running capacitor being also in series with the starting winding of said fan motor, and said running capacitor being of high impedance, said fan motor having two main windings in series, and switching means for said motor, said switching means having an off position wherein an open circuit is provided; a second position establishing two parallel circuits (1) through one of the fan motor main windings and (2) through the fan motor starting winding, and the other fan motor main winding, the latter parallel circuit also including in series the compressor motor and its running capacitor; a third position establishing three parallel circuits (1) through said one of said fan motor main windings, (2) through the fan motor starting winding, and the other fan motor main winding, compressor motor running capacitor and compressor motor starting winding, and, (3) through the compressor motor starting capacitor and starting winding in parallel with the compressor motor main winding; a fourth position establishing three parallel circuits (1) through both fan motor main windings, (2) through the fan motor starting winding, compressor motor running capacitor and compressor motor starting winding, and (3) the compressor motor starting capacitor and starting winding in parallel with the compressor motor main winding; and a fifth position establishing two parallel circuits (1) through both fan motor main windings and (2) through the fan motor starting winding, the latter parallel circuit also including in series the compressor motor and its running capacitor; whereby in the second position said fan motor operates at high speed and said compressor motor does not operate, in the third position the fan motor operates at high speed and the compressor motor also operates, in the fourth position the fan motor operates at low speed and the compressor motor also operates and in the fifth position the fan motor operates at low speed and the compressor motor does not operate.

11. An electric circuit according to claim 10, wherein the starting winding of said fan motor is out of quadrature with the main winding thereof.

12. An electric circuit according to claim 10, wherein the starting winding of said fan motor is at an angle of 120° with respect to the main winding thereof.

13. An electric circuit according to claim 10, wherein the starting winding of said fan motor consists of less turns than the main winding thereof.

No references cited.